United States Patent [19]

Takatsuka

[11] Patent Number: 5,013,994

[45] Date of Patent: May 7, 1991

[54] ELECTRICAL SYSTEM FOR AUTOMOTIVE VEHICLE

[75] Inventor: Hiromichi Takatsuka, Tokyo, Japan

[73] Assignee: Nissan Motor Company, Limited, Yokohama, Japan

[21] Appl. No.: 442,558

[22] Filed: Nov. 29, 1989

[30] Foreign Application Priority Data

Nov. 29, 1988 [JP] Japan .................. 63-154277[U]

[51] Int. Cl.⁵ .................................................. B60L 1/02
[52] U.S. Cl. ........................................ 322/8; 307/10.1; 219/203; 364/424.05
[58] Field of Search .............. 307/9.1, 10.1; 219/202, 219/203; 364/424.05, 431.03, 431.07, 431.1; 123/179 B; 340/441, 670, 671; 322/8

[56] References Cited

U.S. PATENT DOCUMENTS

| | | | |
|---|---|---|---|
| 4,423,307 | 12/1983 | Kondo et al. | 219/202 |
| 4,730,097 | 3/1988 | Campbell et al. | 219/203 |
| 4,780,619 | 10/1988 | Campbell et al. | 307/10.1 |
| 4,884,018 | 11/1989 | Meuret et al. | 322/8 |

Primary Examiner—A. D. Pellinen
Assistant Examiner—Osborn
Attorney, Agent, or Firm—Foley & Lardner

[57] ABSTRACT

An automotive vehicle electrical system has a normal operation mode and a defog or deice operation mode. In the defog operation mode, a higher output of a generator is applied to a vehicle window heater element. The defog operation mode is prevented from being activated until an engine idling gets stable even when the defog operation mode is selected, so as to improve the engine starting performance.

5 Claims, 2 Drawing Sheets

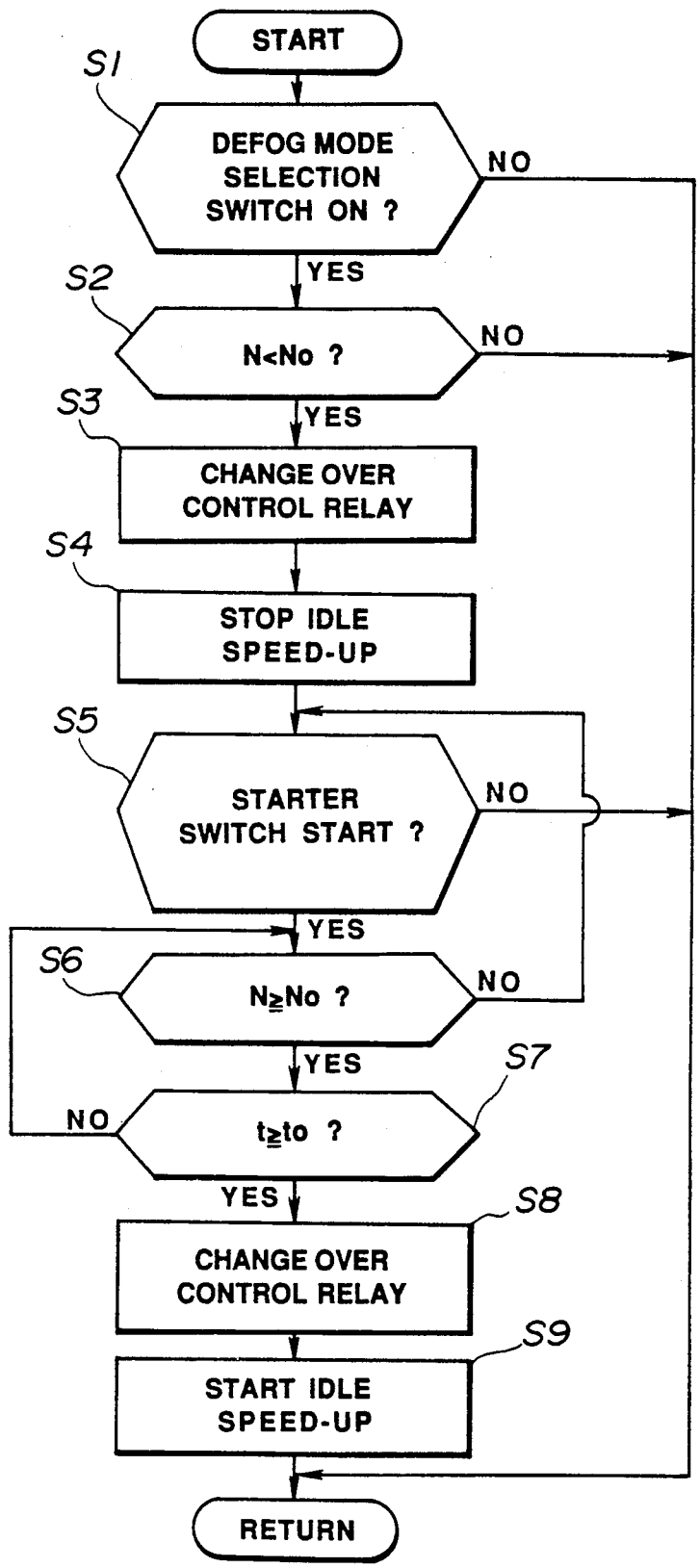

ELECTRICAL SYSTEM FOR AUTOMOTIVE VEHICLE

BACKGROUND OF THE INVENTION

1. Field of the Invention

The present invention relates to an electrical system for an automotive vehicle. More specifically, the present invention relates to an automotive vehicle electrical system having a normal operation mode and a defog or deice operation mode. The defog operation mode is prevented from being activated until an engine idling gets stable even when the defog operation mode is selected, so as to improve the engine starting performance.

2. Description of the Background Art

There has been known an automotive vehicle electrical system having a normal operation mode and a defog or deice operation mode, such as described in Japanese Second Patent Publication No. 61-33735 and U.S. Pat. No. 4,780,619.

In such a known electrical system, however, when an engine starter switch is turned on to start the engine or restart the engine after the engine stall, with a defog mode selection switch being in ON state, a maximum field current is applied to a field winding of a generator to provide a higher output voltage of the generator required in the defog operation mode. Accordingly, a large back electromotive force is generated across stator windings of the generator, which is exerted onto the field winding in a manner to resist the rotation of same which is driven by the vehicle engine. Thus, the engine starting performance is impaired, resulting in the engine stall or in the unstable engine idling just after the engine is started.

Further, since the engine idle speed is controlled higher during the defog operation mode, i.e. while the defog mode selection switch is turned on, the engine idle speed rapidly increases just after the engine is started. This makes a driver feel uneasy about the operation of the engine.

SUMMARY OF THE INVENTION

Therefore, it is an object of the present invention to provide an electrical system for an automotive vehicle having a normal operation mode and a defog operation mode, in which the defog operation mode is prevented from being activated until an engine idling gets stable so as to improve the engine starting performance.

To accomplish the above-mentioned and other objects, according to one aspect of the present invention, an automotive vehicle electrical system having a normal operation mode wherein a first output of a generator is applied to a storage battery, and a defog operation mode wherein a second output of the generator being higher than the first output is applied to a heater element for a vehicle window, comprises selector means for selecting the normal operation mode or the defog operation mode, first means, responsive to the selection of the defog operation mode by the selector means, for deactivating the defog operation mode when an engine speed is below or no more than a predetermined level, second means for detecting a starting of a vehicle engine when the engine speed is below or no more than the predetermined level, third means, responsive to the detection of the starting of the vehicle engine, for activating the defog operation mode after a predetermined lapse of time.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings:

FIG. 2 is a flow chart for explaining the operation of the electrical system shown in FIG. 1.

DESCRIPTION OF THE PREFERRED EMBODIMENT

Figure 1:
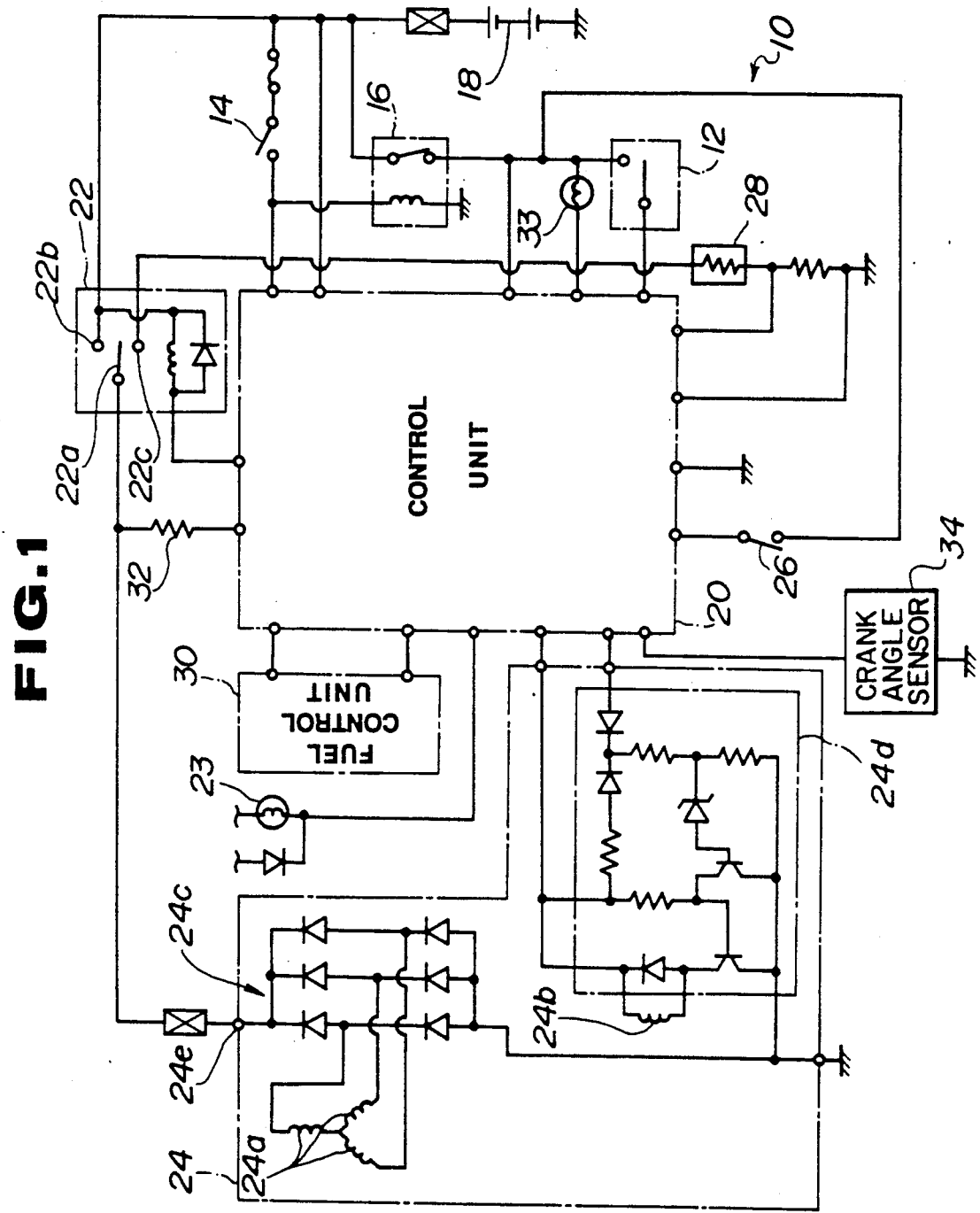
FIG. 1 is a circuit diagram showing an electrical system for an automotive vehicle according to a preferred embodiment of the present invention.

A preferred embodiment of an automotive vehicle electrical system according to the present invention will be described with reference to FIGS. 1 and 2.

FIG. 1 shows a circuit diagram of the electrical system generally designated by reference numeral 10. The electrical system 10 has a normal operation mode and a defog or deice operation mode. In the normal operation mode, a defog mode selection switch 12 is in OFF state as shown in FIG. 1, while in the defog operation mode, the defog mode selection switch 12 is in ON state. When an ignition switch 14 is turned on, an ignition relay 16 is energized by an output of a vehicle battery 18 to energize a control unit 20. The control unit 20 deenergizes a control relay 22, in response to the defog mode selection switch 12 being in OFF state, to connect a movable contact 22a to a first fixed contact 22b. Accordingly, a generator 24 is connected to the storage battery 18 for charging same, and is also connected to other low voltage loads (not shown), such as, an engine starter motor, an ignition device, vehicle lights, electrical instruments, a power window operating device, and the like. This normal operation is indicated to a driver by a normal operation indicator 23. The generator 24 includes three stator windings 24a and a rotatable field winding 24b which is mechanically driven by a vehicle engine (not shown) for producing the three-phase AC voltage across the three stator windings 24a. The three-phase AC voltage is rectified by a full-wave rectifier 24c to be converted to a DC voltage of a controlled constant magnitude. This magnitude control is performed by a voltage regulator 24d which controls an amount of field current applied from the vehicle battery 18 to the rotatable field winding 24b according to an output DC voltage of the generator 24 at its output terminal 24e. The field current is applied from the storage battery 18 to the field winding 24b through the ignition switch 14 and the control unit 20 and further through the voltage regulator 24d. for example, assuming a nominal voltage of the vehicle battery 18 is 12 volts, the voltage regulator 24d regulates the amount of the field current so as to control the output DC voltage of the generator 24 to be 13.5 volts when an output voltage of the storage battery 18 gets below 12.5 volts.

On the other hand, when the defog mode selection switch 12 is turned on, and when the control unit detects based on an input from a transmission shift position sensor 26 that a vehicle transmission is in the park or neutral state, the control unit 20 energizes the control relay 22 to connect the movable contact 22a to a second fixed contact 22c so as to connect the generator 24 to a vehicle window heater element 28. The heater element 28 is, for example, metal particles which are vapor deposited in a vehicle window glass, such as, a windshield glass. Simultaneously, the control unit 20 controls an electronical fuel control unit 30 to increase a fuel amount supplied to the engine to increase the idle speed thereof. This fuel amount control is performed based on a voltage detected across a generator voltage detection resistor 32 such that the detected voltage is controlled to be 60 volts. Naturally, the increase of the engine rotational speed increases the rotational speed of the field winding 24b so that the generator output gets greater. The control unit 20 further controls the amount of the field current supplied to the field winding 24b to be maximum. In this way, the generator 24 generates the higher output of 60 volts suitable for the defog operation mode. This higher output is applied to the heater element 28 to heat the window glass so as to defog or deice same. This defog operation is indicated to the driver by a defog indicator 33.

The defog operation mode is automatically cancelled by the control unit 20 after a lapse of about 5 minutes from a time point when the control relay 22 connects the movable contact 22a to the second fixed contact 22c.

The control unit 20 is further input with an output from an engine speed sensor, such as a crank angle sensor 34, which will be described later with reference to FIG. 2. The crank angle sensor 34 measures the engine speed in a known way.

The control unit 20 is operated in accordance with a flow chart illustrated in FIG. 2.

At step S1, the control unit decides whether the defog mode selection switch 12 is in ON or OFF state. If decision at S1 is NO, step S1 is repeated. If decision at S1 is YES, the routine proceeds to step S2.

At step S2, the control unit determines whether the engine speed N detected by the crank angle sensor 34 is smaller than a predetermined rotational speed No, for example 500 rpm, which is set smaller than a normal idle speed. If decision at S2 is NO, the routine returns to step S1. Accordingly, the defog operation mode is maintained activated to apply the higher voltage to the heater element 28. If decision at S2 is YES, the routine proceeds to step S3.

At step S3, the control unit deenergizes and switches over the control relay 22 to connect the movable contact 22a to the first fixed contact 22b, with the defog mode selection switch 12 maintained in ON state, so as to deactivate the defog operation mode. Simultaneously, the control unit stops to supply the maximum field current to the field winding 24b so as to provide the controlled field current to the field winding 24b through the voltage regulator 24d. Subsequently, at step S4, the control unit stops the idle speed-up operation. Specifically, the control unit controls the fuel control unit 30 to reduce the amount of the fuel which has been increased to satisfy the defog operation mode and to return the fuel amount to that corresponding to the normal idle speed of the engine.

Subsequently, the routine proceeds to step S5 at which the control unit determines whether an engine starter switch is ON, i.e. whether an engine crankshaft is cranking to start the engine. If decision at S5 is NO, the routine returns to step S1 so that the defog operation mode is maintained deactivated. If decision at S5 is YES, then the routine proceeds to step S6.

At step S6, the control unit decides whether the detected engine speed N is no less than the predetermined speed No so as to check whether the engine is effectively started. If decision at S6 is NO, the routine returns to step S5 to check whether the engine is still in the cranking state. If decision at step S6 is YES, the routine proceeds to step S7.

At step S7, the control unit decides whether a time t is more than or equal to a predetermined time to, to determine whether the engine idling gets stable. The time t indicates a lapse of time after the engine has been effectively started, i.e. the detected engine speed N gets higher than or equal to the predetermined speed No. If decision at S7 is NO, the routine returns to step S6 to repeat step S6 and step S7. If decision at S7 is YES, the routine proceeds to step S8.

At step S8, the control unit energizes and switches over the control relay 22 to connect the movable contact 22a to the second fixed contact 22c so as to activate the defog operation mode. Simultaneously, the control unit applies the maximum field current to the field winding 24b. Subsequently, at step S9, the control unit starts the idle speed-up operation. Specifically, the control unit controls the fuel control unit 30 to increase the amount of the fuel to the level which satisfies the defog operation mode.

In the electrical system as described above, when the starter switch is turned on to start the engine or restart the engine after the engine stall, with the defog mode selection switch 12 being in ON state, the control unit 20 prevents the defog operation mode from being activated until the engine idling gets stable, i.e. until the predetermined time passes after the detected engine idle speed N gets higher than or equal to the predetermined speed No. Accordingly, since the controlled amount of the field current is applied to the field winding 24b until the defog operation mode is activated, the back electromotive force generated across the stator windings 24a is controlled smaller so that the engine starting performance is not impaired. Further, since the sufficient amount of the electric power is supplied to the starter motor during the engine cranking and to the ignition device during the engine cranking and just after the engine starting, the engine starting performance is ensured also in this aspect. Still further, since the engine idle speed is increased after the engine idling gets stable, the rapid speed-up just after the engine starting is prevented so that the driver does not feel uneasy about the operation of the engine.

It is to be understood that the invention is not to be limited to the embodiments described above, and that various changes and modifications may be made without departing from the spirit and scope of the invention as defined in the appended claims.

What is claimed is:

1. An electrical system for an automotive vehicle, said electrical system having a normal operation mode wherein a first output of a generator is applied to a storage battery, and a defog operation mode wherein a second output of the generator being higher than said first output is applied to a heater element for a vehicle window, said electrical system comprising:

selector means for selecting said normal operation mode or said defog operation mode;

first means, responsive to the selection of the defog operation mode by said selector means, for deactivating said defog operation mode when an engine speed is below or no more than a predetermined level;

second means for detecting a starting of a vehicle engine when the engine speed is below or no more than said predetermined level;

third means, responsive to the detection of said starting of the vehicle engine by said second means, for activating said defog operation mode after a predetermined lapse of time.

2. The electrical system as set forth in claim 1, wherein said second means comprises fourth means for detecting whether the vehicle engine is in a cranking state, and fifth means, responsive to the detection of the engine cranking by said fourth means, for detecting whether the engine speed is above or no less than said predetermined level.

3. The electrical system as set forth in claim 2, wherein said predetermined lapse of time commences from a time point when the engine speed gets above or no less than said predetermined level.

4. The electrical system as set forth in claim 1, wherein said first and third means include a relay circuit which connects the generator to the storage battery for deactivating the defog operation mode and connects the generator to the heater element for activating the defog operation mode.

5. The electrical system as set forth in claim 1, wherein said selector means is a manually operated switch.

* * * * *